US012259691B2

(12) United States Patent
Kaneko

(10) Patent No.: US 12,259,691 B2
(45) Date of Patent: Mar. 25, 2025

(54) ELECTRONIC WATCH

(71) Applicant: Seiko Epson Corporation, Tokyo (JP)

(72) Inventor: Yoshihide Kaneko, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 721 days.

(21) Appl. No.: 16/911,472

(22) Filed: Jun. 25, 2020

(65) Prior Publication Data

US 2020/0409313 A1 Dec. 31, 2020

(30) Foreign Application Priority Data

Jun. 27, 2019 (JP) ................................ 2019-119687

(51) Int. Cl.

*G04G 5/00* (2013.01)
*G04B 19/04* (2006.01)
*G04B 19/24* (2006.01)
*G04B 27/00* (2006.01)
*G04C 3/14* (2006.01)
*G04C 10/02* (2006.01)
*G04R 20/02* (2013.01)
*G04R 60/12* (2013.01)

(52) U.S. Cl.

CPC ............... *G04G 5/00* (2013.01); *G04B 19/04* (2013.01); *G04B 19/24* (2013.01); *G04B 27/002* (2013.01); *G04C 3/146* (2013.01); *G04C 10/02* (2013.01); *G04R 20/02* (2013.01); *G04R 60/12* (2013.01)

(58) Field of Classification Search

CPC .................................. G04G 5/00; G04R 20/02
See application file for complete search history.

(56) References Cited

U.S. PATENT DOCUMENTS 2,979,884 A * 4/1961 Gordon ................ G04B 19/264 235/85 FC
3,114,238 A * 12/1963 Le Blanc ............. G04B 18/028 368/186
6,269,055 B1 * 7/2001 Pikula .................... G04C 10/04 368/21
6,411,568 B1 * 6/2002 Logan ...................... G04G 3/02 368/10

(Continued)

FOREIGN PATENT DOCUMENTS

JP 2015-102530 A 6/2015
JP 2017-049228 A 3/2017

(Continued)

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

An electronic watch includes memory that stores a reference time and a time difference relative to the reference time, a timekeeper that clocks the reference time, a time display unit that includes an hour hand displaying a display time based on the reference time and the time difference, a calendar display unit that displays a date based on the reference time and the time difference, an operation device that includes a crown or a button, and a controller that, in a set time-difference setting range, corrects the time difference at a regular interval for each of operations of the operation device, and updates the hour hand and the date in accordance with the corrected time difference.

4 Claims, 12 Drawing Sheets

(56) References Cited

U.S. PATENT DOCUMENTS

| | | | | |
|---|---|---|---|---|
| 8,705,321 | B2 * | 4/2014 | Akiyama | G04R 20/06 368/21 |
| 2004/0228219 | A1 * | 11/2004 | Miyahara | G04R 20/08 368/47 |
| 2006/0018201 | A1 * | 1/2006 | Lizzi | G04C 19/04 368/244 |
| 2015/0146503 | A1 | 5/2015 | Nakanishi | |
| 2017/0060098 | A1 | 3/2017 | Yonekura et al. | |
| 2018/0217557 | A1 | 8/2018 | Tezuka | |
| 2018/0267483 | A1 | 9/2018 | Baba | |

FOREIGN PATENT DOCUMENTS

| | | | |
|---|---|---|---|
| JP | 2018-119925 | A | 8/2018 |
| JP | 2018151372 | A | 9/2018 |

* cited by examiner

ELECTRONIC WATCH

The present application is based on, and claims priority from JP Application Serial Number 2019-119687, filed Jun. 27, 2019, the disclosure of which is hereby incorporated by reference herein in its entirety.

BACKGROUND

1. Technical Field

The present disclosure relates to an electronic watch.

2. Related Art

As in JP-A-2015-102530, for example, an electronic watch of related art has an abbreviation of a representative city name for each time zone described on a dial of the watch, a bezel of an outer case, or the like. As a method for manually setting a time difference of the electronic watch, a method for manually operating a second hand and setting the time difference based on a time zone indicated by the second hand is known.

However, there are many cases in which a user is not correctly aware of the time zone of each of regions, and the user finds it difficult to select the correct time zone. Therefore, it is desirable to be able to correctly set the time difference simply, by correctly setting a displayed date and time of the electronic watch, even when the user does not know the time zone. On the other hand, a watch that manages a time difference, such as a watch that receives satellite signals, often internally manages time information including date (year, month and day) information, but sometimes simply displays the date without information regarding the month and year. Thus, even when the displayed day and time of the watch are correctly set, there have been cases in which the time difference cannot be set correctly, as a result of inconsistencies in the internally managed month and year information. For example, if the electronic watch is put forward by one month, even if the displayed date is correct, the date will eventually be displayed incorrectly because the month is wrong. In other words, there is a problem in that the time difference is incorrectly set.

SUMMARY

An electronic watch of the present disclosure includes memory configured to store a reference time and a time difference relative to the reference time, a timekeeper configured to clock the reference time, a time display unit including an hour hand and configured to display a display time based on the reference time and the time difference, a calendar display unit configured to display a date based on the reference time and the time difference, an operation device including a crown or a button, and a controller configured to correct, within a set time-difference setting range, the time difference at a regular interval for each of operations of the operation device, and to update the hour hand and the date in accordance with the time difference corrected for each of the operations of the operation device.

In the above-described electronic watch, the time-difference setting range is preferably one month relative to the reference time clocked by the timekeeper.

In the above-described electronic watch, the time-difference setting range preferably has a forward setting range of up to 15 days and a backward setting range from 12 days to 15 days relative to the reference time clocked by the timekeeper.

In the above-described electronic watch, the time-difference setting range preferably has 23:59 as an upper limit time for a forward setting range, and has 00:00 as a lower limit time for a backward setting range.

In the above-described electronic watch, an interval of correction of the time difference is preferably one hour or 15 minutes, and the interval of correction is preferably switched over based on the operation of the operating device.

In the above-described electronic watch, correction of the time difference is preferably performed, with a value of the time difference being looped within the time-difference setting range.

DESCRIPTION OF EXEMPLARY EMBODIMENTS

Embodiments of the present disclosure will be described below with reference to the drawings. Note that, hereinafter, in each of the drawings, in order to illustrate each of layers or each of members at a recognizable size, a scale of each of the layers or each of the members is different from an actual scale.

Figure 1:
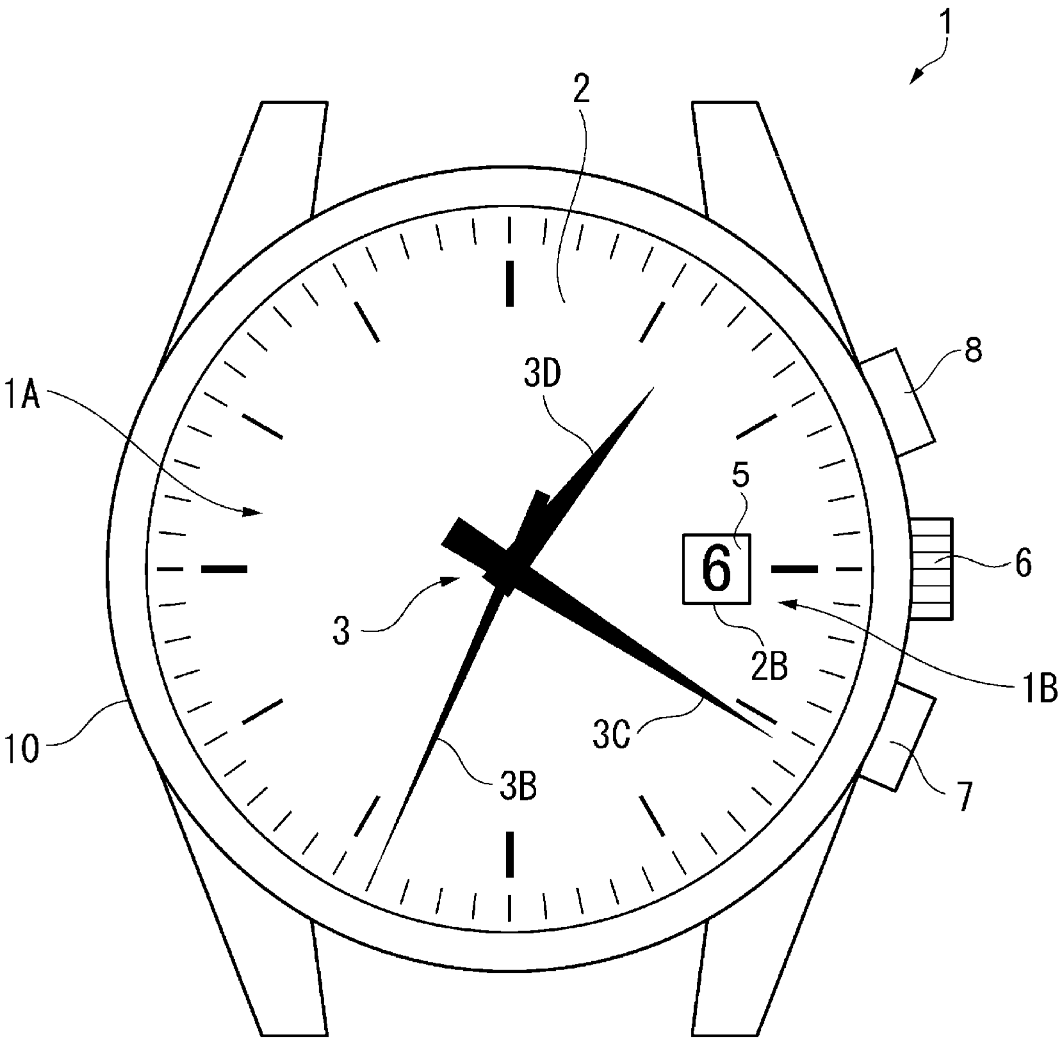
FIG. 1 is a front view illustrating an external appearance of an electronic watch.
Figure 2:
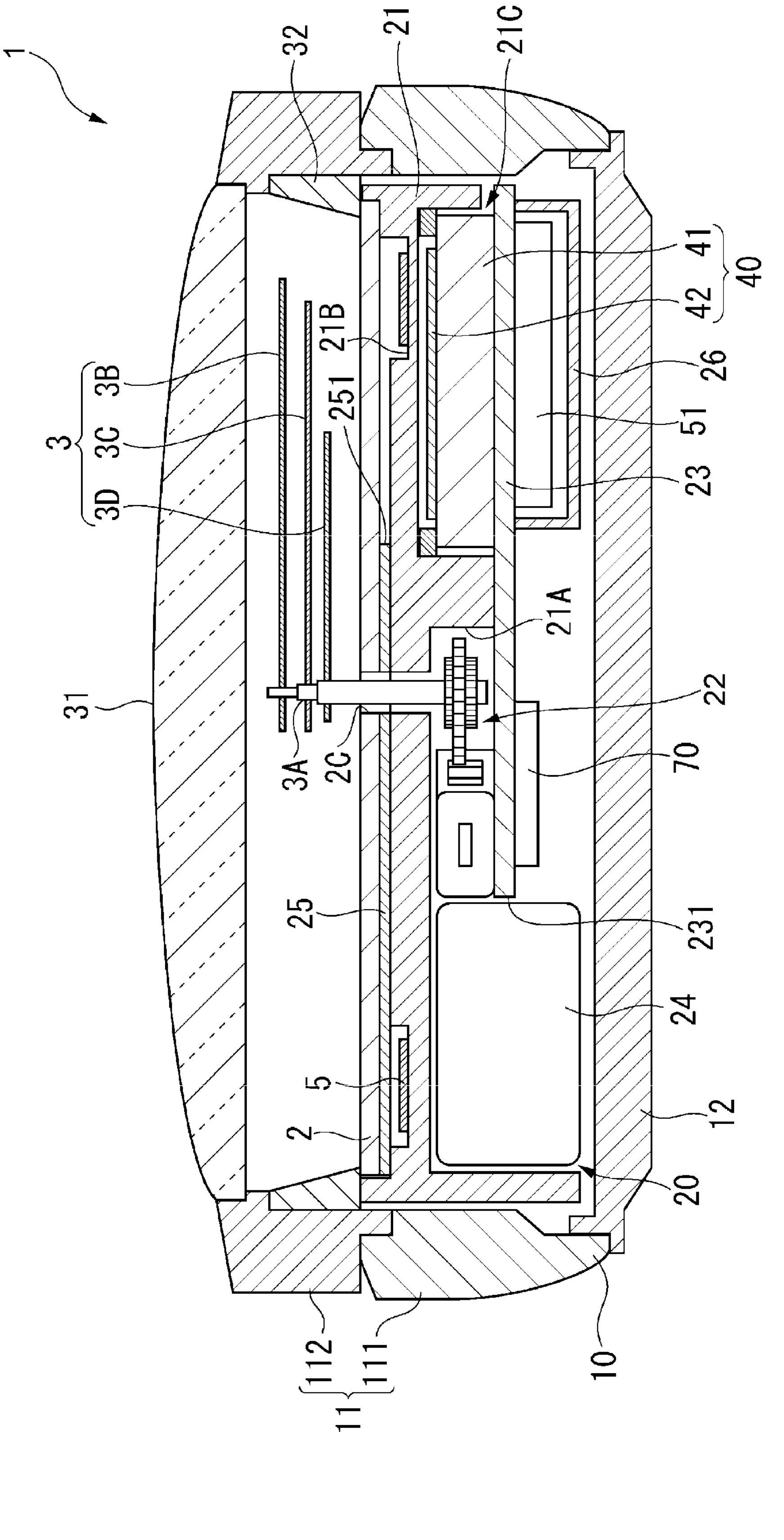
FIG. 2 is a cross-sectional view illustrating a structure of the electronic watch.
Figure 3:
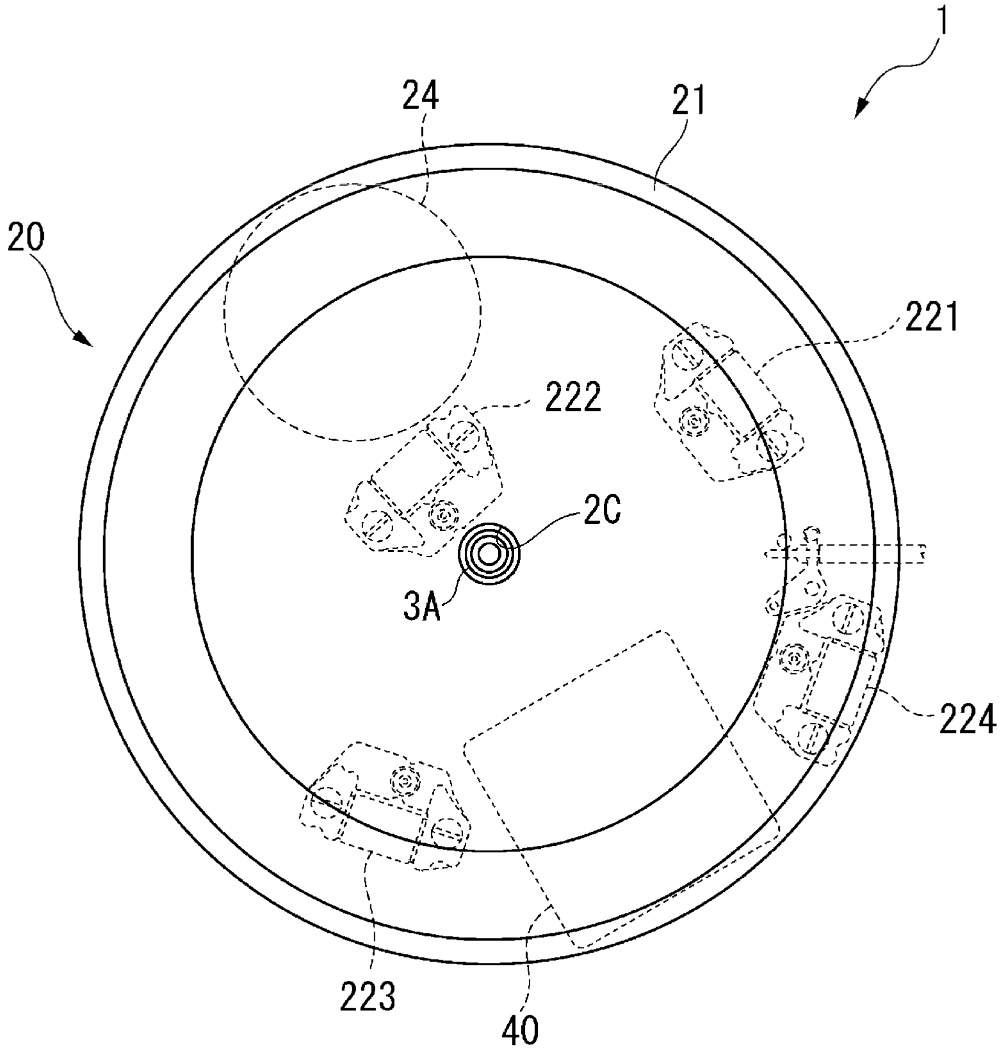
FIG. 3 is a plan view illustrating a structure of a movement.

FIG. 1 is a front view illustrating an external appearance of an electronic watch. FIG. 2 is a cross-sectional view illustrating a structure of the electronic watch illustrated in FIG. 1. FIG. 3 is a plan view illustrating a structure of a movement configuring the electronic watch. A configuration of the electronic watch will be described below with reference to FIG. 1 to FIG. 3.

As illustrated in FIG. 1 and FIG. 2, an electronic watch 1 is an electronic watch provided with a time display unit 1A for displaying a time that includes a dial 2 and hands 3, and a calendar display unit 1B that includes a date window 2B of the dial 2 and a date indicator 5.

The dial 2 is formed in a disk shape by a non-electrically conductive member, such as polycarbonate. The date window 2B is provided at a three o'clock position of the dial 2. In addition to the date window 2B, a through hole 2C, through which a hand shaft 3A of the hands 3 (see FIG. 2) is inserted, is also formed in the dial 2. The through hole 2C is formed at a center position of a flat surface of the dial 2.

The hands 3 are configured by a second hand 3B, a minute hand 3C, and an hour hand 3D. The hands 3 and the date indicator 5 are driven via a drive mechanism 22 including a step motor, a train wheel, and the like.

Further, as illustrated in FIG. 1, the electronic watch 1 is provided with a crown 6, a four o'clock button 7, and a two o'clock button 8 for external operations. The crown 6, the four o'clock button 7, and the two o'clock button 8 configure an input device 53 (see FIG. 4) that serves as an operation device. The four o'clock button 7 and the two o'clock button 8 are examples of a button. In addition, the input device 53 is configured by a winding stem, a switch wheel (not illustrated) attached to the winding stem, a switch contact spring that is depressed by the switch wheel, and two electrodes provided on a printed circuit board 23. The crown 6 is attached to the tip of the winding stem. The switch wheel causes the switch contact spring to come into contact with one of the two electrodes every time the crown 6 is rotated to the right by a predetermined angle. Then, the switch wheel causes the switch contact spring to come into contact with the other of the two electrodes every time the crown 6 is rotated to the left by the predetermined angle. As a result, it is detected that the crown 6 has been rotated to the right and to the left, and at the same time, input is performed.

The electronic watch 1 is configured to receive satellite signals from a plurality of GPS satellites, which are orbiting above the Earth following a predetermined orbit, in order to obtain satellite time information, and to correct internal time information.

As illustrated in FIG. 1 and FIG. 2, the electronic watch 1 includes an outer case 10 that houses a movement 20 and the like. The outer case 10 includes a case main body 11 and a case back 12. The case main body 11 includes a cylindrical case body 111 and a bezel 112 provided on the front surface side of the case body 111.

The bezel 112 is formed in a ring shape. Then, the bezel 112 and the case body 111 are coupled together using a technique such as a fitting structure configured by a concave unit and a convex unit formed on opposing surfaces of the bezel 112 and the case body 111, a double-sided adhesive tape, an adhesive, or the like. Note that the bezel 112 may be rotatably attached to the case body 111. Further, a cover glass 31 held by the bezel 112 is attached to the inside of the bezel 112.

The disk-shaped case back 12 that covers an opening on the back surface side of the case main body 11 is provided on the back surface side of the case main body 11. The case back 12 is coupled to the case body 111 using a screw structure.

Note that in the present embodiment, the case body 111 and the case back 12 are configured as separate bodies, but the present invention is not limited to this example, and the case body 111 and the case back 12 may be an integrated one-piece case. Conductive metal materials, such as BS (brass), SUS (stainless steel), titanium alloys, and the like, are used for the case body 111, the bezel 112, and the case back 12.

Next, an internal structure built in the outer case 10 of the electronic watch 1 will be described. As illustrated in FIG. 1 and FIG. 2, the movement 20, a planar antenna 40, the date indicator 5, and the like are housed in the outer case 10 as well as the dial 2.

The movement 20 is provided with a main plate 21, the drive mechanism 22 supported by the main plate 21, the printed circuit board 23, a secondary battery 24, and a solar panel 25.

The main plate 21 is formed of a non-conductive member, such as plastic. The main plate 21 is provided with a drive mechanism housing unit 21A that houses the drive mechanism. 22, a date indicator arrangement unit 21B in which the date indicator 5 is arranged, and an antenna housing unit 21C that houses the planar antenna 40. The date indicator arrangement unit 21B is configured by a ring-shaped groove formed in the front surface of the main plate 21. The drive mechanism housing unit 21A and the antenna housing unit 21C are provided on the back surface side of the main plate 21.

The driving mechanism 22 is housed in the drive mechanism housing unit 21A of the main plate 21, and drives the hands 3 of the time display unit 1A and the date indicator 5 of the calendar display unit 1B. In other words, the drive mechanism 22 includes a first step motor 221 (see FIG. 3) and a first train wheel (not illustrated) that drive the hour hand 3D, a second step motor 222 (see FIG. 3) and a second train wheel (not illustrated) that drive the minute hand 3C, a third step motor 223 (see FIG. 3) and a third train wheel (not illustrated) that drive the second hand 3B, and a fourth step motor 224 (see FIG. 3) and a fourth train wheel (not illustrated) that drive the date indicator 5. In other words, the first step motor 221 configures an hour hand motor, the second step motor 222 configures a minute hand motor, the third step motor 223 configures a second hand motor, and the fourth step motor 224 configures a date indicator motor.

As illustrated in FIG. 2, the printed circuit board 23 is formed in a substantially circular shape in plan view, and has a notched portion 231 having a substantially circular shape in which the secondary battery 24 (see FIG. 3) is disposed is formed. This printed circuit board 23 is fixed to the main plate 21 by screws or the like, with the front surface thereof, which is a surface on the dial 2 side, being in contact with the back surface of the main plate 21. The planar antenna 40 is mounted on the front surface side of the printed circuit board 23. Further, a receiver 51, which is a reception unit for processing the satellite signals received from the GPS satellites, a controller 70 serving as a control unit that controls the step motors 221 to 224, a power supply IC (not illustrated), and the like are mounted on the back surface side of the printed circuit board 23.

In the present embodiment, the receiver 51, the controller 70, and the power supply IC are disposed on the opposite side of the printed circuit board 23 with respect to the planar antenna 40. As a result, digital noise generated from a reception circuit or a power supply circuit is less likely to reach the planar antenna 40, and reception sensitivity can thus be improved. Further, since the receiver 51 is surrounded by a shield plate 26, the receiver 51 is not affected by noise generated by the controller 70.

The secondary battery 24 is a button-type lithium ion battery formed in a circular shape in plan view. The secondary battery 24 supplies power to the drive mechanism 22, the receiver 51, the controller 70, and the like. The secondary battery 24 is provided in the notched portion 231 of the printed circuit board 23.

A surface electrode of the solar panel 25 is formed by a transparent electrode such as indium tin oxide (ITO) in order to allow light to pass through. Further, a thin film of an amorphous silicon semiconductor is formed, as a power generating layer, on a base configured by a resin film.

Since the frequency of the satellite signals from the GPS satellites is approximately 1.5 GHz and is a high frequency, even with the thin transparent electrode, radio waves are easily attenuated and antenna characteristics deteriorate, unlike in the case of long standard radio waves received by a radio wave watch. Thus, a notched portion 251 is formed in a section, overlapping with the planar antenna 40 in plan view, of the solar panel 25 formed in the disk shape. Thus, the solar panel 25 is disposed on the front surface side of the main plate 21 and is not disposed on the front surface side of the planar antenna 40. Therefore, the planar antenna 40 can receive the radio waves through the notched portion 251 of the solar panel 25. Note that an opening that overlaps in plan view with the date window 2B of the dial 2, and a hole through which the hand shaft 3A of the hands 3 is inserted are formed in the solar panel 25.

The planar antenna 40 that is a patch antenna (a microstrip antenna) is disposed in the antenna housing unit 21C. The planar antenna 40 receives the satellite signals from the GPS satellites. This planar antenna 40 will be described in detail later.

The date indicator 5, which is a calendar indicator formed in a ring shape and has a date displayed on the front surface thereof, is arranged in the date indicator arrangement unit 21B of the main plate 21. The date indicator 5 is formed of a non-electrically conductive member, such as plastic. Here, the date indicator 5 overlaps with at least a portion of the planar antenna 40 in plan view.

The dial 2 is disposed on the front surface side of the main plate 21 so as to cover the front surface side of the solar panel 25 and the date indicator 5. The dial 2 is formed of a material, such as a plastic, which is non-conductive and transmissive enough to allow at least part of the light to pass through.

A dial ring 32, which is a ring member formed of a synthetic resin, which is a non-electrically conductive member, is provided on the front surface side of the dial 2. The synthetic resin is, for example, an ABS resin. The dial ring 32 is disposed along the periphery of the dial 2. When the dial ring 32 is formed of plastic, a reception performance can be ensured, and, since the dial ring 32 can be formed in a complex shape, the design thereof can be improved. The dial ring 32 is held as a result of being pressed toward the dial 2 side by the bezel 112.

In plan view, the planar antenna 40 overlaps with the date indicator 5, the dial 2, the main plate 21, and the cover glass 31, each of which is formed of a non-conductive member, but does not overlap with the case body 111 and the bezel 112, and the solar panel 25.

Thus, the satellite signals propagated from the watch front surface side pass through the cover glass 31, then pass through the dial 2, the date indicator 5, and the main plate 21, and is incident on the planar antenna 40 without being blocked by the case main body 11 or the solar panel 25. Note that since the hands 3 have a small area overlapping with the planar antenna 40, even if the hands 3 are made of metal, this does not affect the reception of the satellite signals. However, the hands 3 are preferably formed of a non-conductive member so that the effect of blocking the satellite signals can be more effectively avoided. Further, in the present embodiment, the planar antenna 40 is not limited to the patch antenna. Note that the planar antenna 40 may be an inverted F antenna or a chip antenna.

The GPS satellite transmits the satellite signals using right-handed circularly polarized waves. Therefore, the planar antenna 40 of the present embodiment is configured by the patch antenna that has excellent circular polarization characteristics. The patch antenna is also referred to as a microstrip antenna. The planar antenna 40 of the present embodiment is a patch antenna in which a conductive antenna electrode 42 is layered on a ceramic dielectric substrate 41.

This planar antenna 40 can be manufactured in the following manner. First, using barium titanate having a relative dielectric constant of approximately 60 to 100 as a main raw material, a desired shape is formed using a press, and then after a firing process, ceramics that serve as the dielectric substrate 41 of the antenna are completed. A GND electrode (not illustrated) that serves as a ground (GND) of the antenna is formed on a surface on the printed circuit board 23 side, which is the back surface of the dielectric substrate 41, by screen printing thereon a paste material, mainly such as silver (Ag). The antenna electrode 42, which determines the frequency of the antenna and the polarization of the signals received, is formed, in the same manner as the GND electrode, on a surface that is the front surface of the dielectric substrate 41, that is, the surface on the main plate 21 and the dial 2 side.

This planar antenna 40 is mounted on the front surface of the printed circuit board 23 and is electrically coupled to a GPS module, which is the receiver 51 mounted on the back surface of the printed circuit board 23. Further, the printed circuit board 23 functions as a ground plate (a ground plane) by causing the GND electrode of the planar antenna 40 to be conductive with a ground unit of the receiver 51 via a ground pattern of the printed circuit board 23. Furthermore, by causing the ground unit of the receiver 51 to be conductive with the metal case body 111 and the metal case back 12 via the ground pattern of the printed circuit board 23, the case body 111 and the case back 12 can be used as the ground plane. This planar antenna 40 is disposed in the antenna housing unit 21C by fixing the printed circuit board 23 to the main plate 21.

Figure 4:
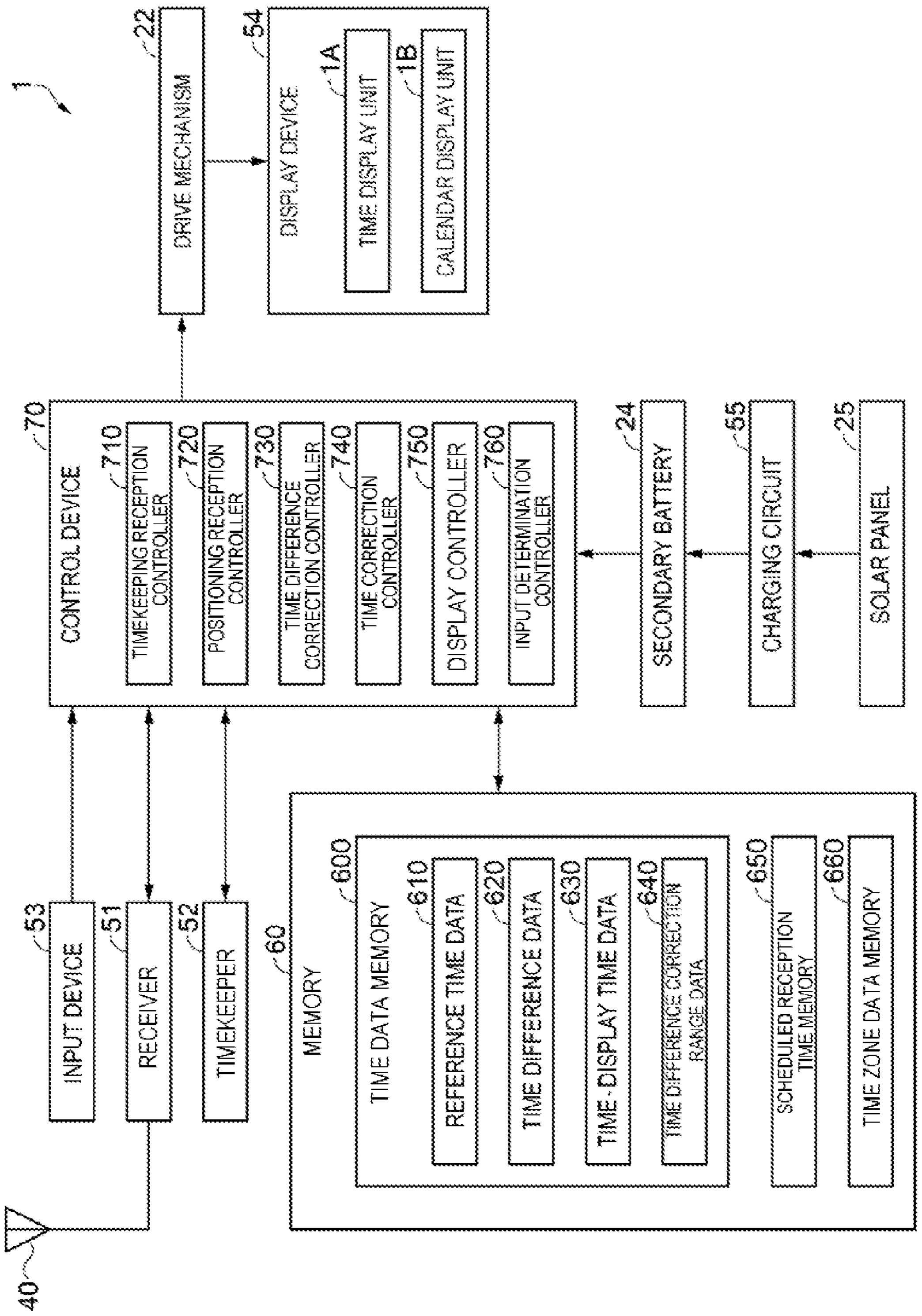
FIG. 4 is a block diagram illustrating a circuit configuration of the electronic watch.
Figure 5:
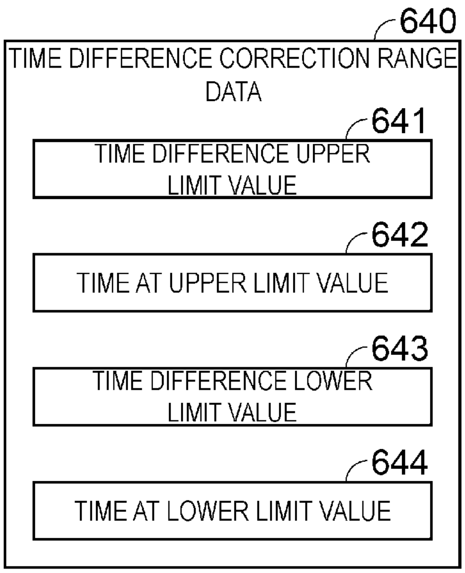
FIG. 5 is a block diagram illustrating a configuration of time difference correction range data.

FIG. 4 is a block diagram illustrating a circuit configuration of the electronic watch 1. FIG. 5 is a block diagram illustrating a configuration of time difference correction range data that serves as a time-difference setting range. Hereinafter, the circuit configuration of the electronic watch 1 will be described with reference to FIG. 4 and FIG. 5.

As illustrated in FIG. 4, the electronic watch 1 is provided with the receiver 51, the controller 70, a timekeeper 52 that serves as a clocking unit, a memory 60, an input device 53, and a charging circuit 55 that stores the power generated by the solar panel 25 in the secondary battery 24 and performs charging.

The receiver 51 is driven by the power stored in the secondary battery 24 and, when driven by the controller 70, receives the satellite signal transmitted from the GPS satellite via the planar antenna 40. Then, when the receiver 51 has successfully received the satellite signal, the receiver 51 transmits information, such as acquired orbit information, and GPS time information, to the controller 70. On the other hand, when the receiver 51 has failed to receive the satellite signal, the receiver 51 transmits information regarding the failed reception to the controller 70. Note that the configuration of the receiver 51 is the same as a configuration of a known GPS reception circuit, so a description thereof is omitted herein.

The timekeeper 52 is provided with a crystal oscillator and the like that are driven by the power stored in the secondary battery 24, and updates reference time data 610, which serves as a reference time, using a reference signal based on an oscillation signal of the crystal oscillator.

The input device 53 is configured by the crown 6, the four o'clock button 7, and the two o'clock button 8, and transmits, to the controller 70, an operation signal corresponding to an operation of the crown 6, the four o'clock button 7, or the two o'clock button 8.

As illustrated in FIG. 4, the memory 60 that serves as memory is provided with a time data memory 600, a scheduled reception time memory 650, and a time zone data memory 660.

The reference time data 610, time difference data 620 that serves as a time difference, time-display time data 630 that serves as a display time, and time difference correction range data 640 are stored in the time data memory 600.

The GPS time, which is the time information acquired from the satellite signal, and current leap second information are stored in the reference time data 610. This reference time data 610 is normally updated every second by the timekeeper 52, and when the satellite signal is received, the reference time data 610 is corrected by the acquired time information and current leap second information. In other words, the UTC, which is the coordinated universal time, is stored in the reference time data 610.

A time obtained by incorporating the time difference data 620 into the reference time data 610 is stored in the time-display time data 630. When the time difference data 620 is received in a positioning mode, the time difference data 620 is set using location information obtained by the reception. In addition, the time difference data 620 is also corrected by the operation of the crown 6.

As illustrated in FIG. 5, a time difference upper limit value 641, a time at the upper limit value 642, a time difference lower limit value 643, and a time at the lower limit value 644 are stored in the time difference correction range data 640. The time difference correction range data 640 is set so that, relative to the reference time data 610, a boundary value in a forward direction is set to +15 days, a boundary value in the opposite backward direction is set from −12 to −15 days, and a range from the boundary value in the forward direction to the boundary value in the backward direction is one month. When the time difference data 620 is corrected by the operation of the crown 6, the time difference data 620 to be set is a value that is equal to or greater than the time difference lower limit value 643 and equal to or less than the time difference upper limit value 641.

A scheduled reception time, at which scheduled time reception processing is performed in a timekeeping reception controller 710, is stored in the scheduled reception time memory 650. A time at which a forced reception has been successfully performed a previous time, as a result of operating the four o'clock button 7, is stored as the scheduled reception time.

The location information and corresponding time difference information are stored in association with each other in the time zone data memory 660. For example, the location information is the latitude and longitude. Thus, when the location information is acquired by reception processing of the positioning mode, the controller 70 is configured to be able to acquire the time difference based on the location information.

The controller 70 is configured by a CPU that controls the electronic watch 1. The controller 70 includes the timekeeping reception controller 710, a positioning reception controller 720, a time difference correction controller 730, a time correction controller 740, a display controller 750, and an input determination controller 760.

The timekeeping reception controller 710 operates the receiver 51 to perform the reception processing in the timekeeping mode. In the present embodiment, the reception processing in the timekeeping mode is performed through automatic reception processing and manual reception processing.

There are two types of automatic reception processing, which are scheduled time automatic reception processing and optical automatic reception processing. In other words, when the time-display time data 630, which is being clocked, matches the scheduled reception time stored in the scheduled reception time memory 650, the timekeeping reception controller 710 operates the receiver 51 to perform the scheduled time automatic reception processing in the timekeeping mode.

Further, when the power generation voltage or the power generation current of the solar panel 25 is equal to or greater than a set value, and it can be determined that the solar panel 25 is irradiated with sunlight in the open air, the timekeeping reception controller 710 operates the receiver 51 to perform the optical automatic reception processing in the timekeeping mode. Note that a number of times that the processing in which the receiver 51 is operated in accordance with the power generation state of the solar panel 25 is performed may be limited to once per day or the like. Further, when a user presses the four o'clock button 7 to perform a forced reception operation, the timekeeping reception controller 710 operates the receiver 51 to perform the manual reception processing in the timekeeping mode.

The reception processing in the timekeeping mode performed in the timekeeping reception controller 710 is processing for locating at least one of the GPS satellites by the receiver 51, receiving the satellite signal transmitted from the GPS satellite, and acquiring the time information.

When the user presses the two o'clock button 8 to perform the forced reception operation, the positioning reception controller 720 operates the receiver 51 to perform the reception processing in the positioning mode.

When the positioning reception controller 720 starts the reception processing in the positioning mode, the positioning reception controller 720 locates at least three, and preferably four or more of the GPS satellites using the receiver 51, receives the satellite signal transmitted from each of the GPS satellites, and calculates and acquires the location information. In addition, when the positioning reception controller 720 receives the satellite signals, the positioning reception controller 720 can simultaneously acquire the time information.

When the positioning reception controller 720 has successfully acquired the location information, the time difference correction controller 730 sets the time difference data 620 on the basis of the acquired location information, that is, the acquired latitude and longitude. Specifically, the controller 70 selects and acquires the time difference information corresponding to the location information stored in the time zone data memory 660, and stores the information in the time difference data 620.

For example, since Japanese standard time (JST) is a time that is 9 hours in advance of UTC (UTC +9), when the location information acquired by the positioning reception controller 720 is Japan, the controller 70 reads the time difference information (+9 hours) from the time zone data memory 660 and stores the information in the time difference data 620.

Further, the time difference correction controller 730 sets the time difference data 620 in accordance with a rotation operation of the crown 6. Note that a method for setting the time difference data 620 in accordance with the rotation operation of the crown 6 will be described in detail below.

When the time difference correction controller 730 sets the time difference data 620, the time-display time data 630 is corrected using the time difference data 620. Thus, the time-display time data 630 is a time obtained by adding the time difference data 620 to the reference time data 610, which is UTC.

When the timekeeping reception controller 710 or the positioning reception controller 720 has successfully acquired the time information in the reception processing, the time correction controller 740 corrects the reference time data 610 using the acquired time information. Thus, the time-display time data 630 is also corrected. When the time-display time data 630 is corrected, the time indicated by the hands 3, which are synchronized with the time-display time data 630, is also corrected. Note that the hands 3 are synchronized with the time-display time data 630 using a known hand position detection method.

The display controller 750 controls the drive mechanism. 22 to control display of the display device 54 configured by the time display unit 1A and the calendar display unit 1B. Specifically, by controlling the drive mechanism 22, the display controller 750 controls movements of the hands 3 and the date indicator 5.

The input determination controller 760 determines an input operation on the basis of an operation signal corresponding to the operation of the crown 6, the four o'clock button 7, and the two o'clock button 8, the operation signal being transmitted from the input device 53. Specifically, with respect to the operation signal from the crown 6, it is determined whether the position of the crown 6 is a 0th stage, a first stage, or a second stage, and whether the rotation direction of the crown 6 is a rotation to the right or a rotation to the left. In the present embodiment, a position at which the crown 6 is pressed in furthest is referred to as the 0th stage, a position at which the crown 6 is pulled out from the 0th stage is referred to as the first stage, and a position at which the crown 6 is further pulled out from the first stage is referred to as the second stage With respect to the operation signal from the four o'clock button 7, it is determined whether or not the four o'clock button 7 is being pressed, and, when it is being pressed, how long the four o'clock button 7 has been pressed continuously. With respect to the operation signal from the two o'clock button 8, it is determined whether or not the two o'clock button 8 is being pressed, and, when it is being pressed, how long the two o'clock button 8 has been pressed continuously.

Figure 6:
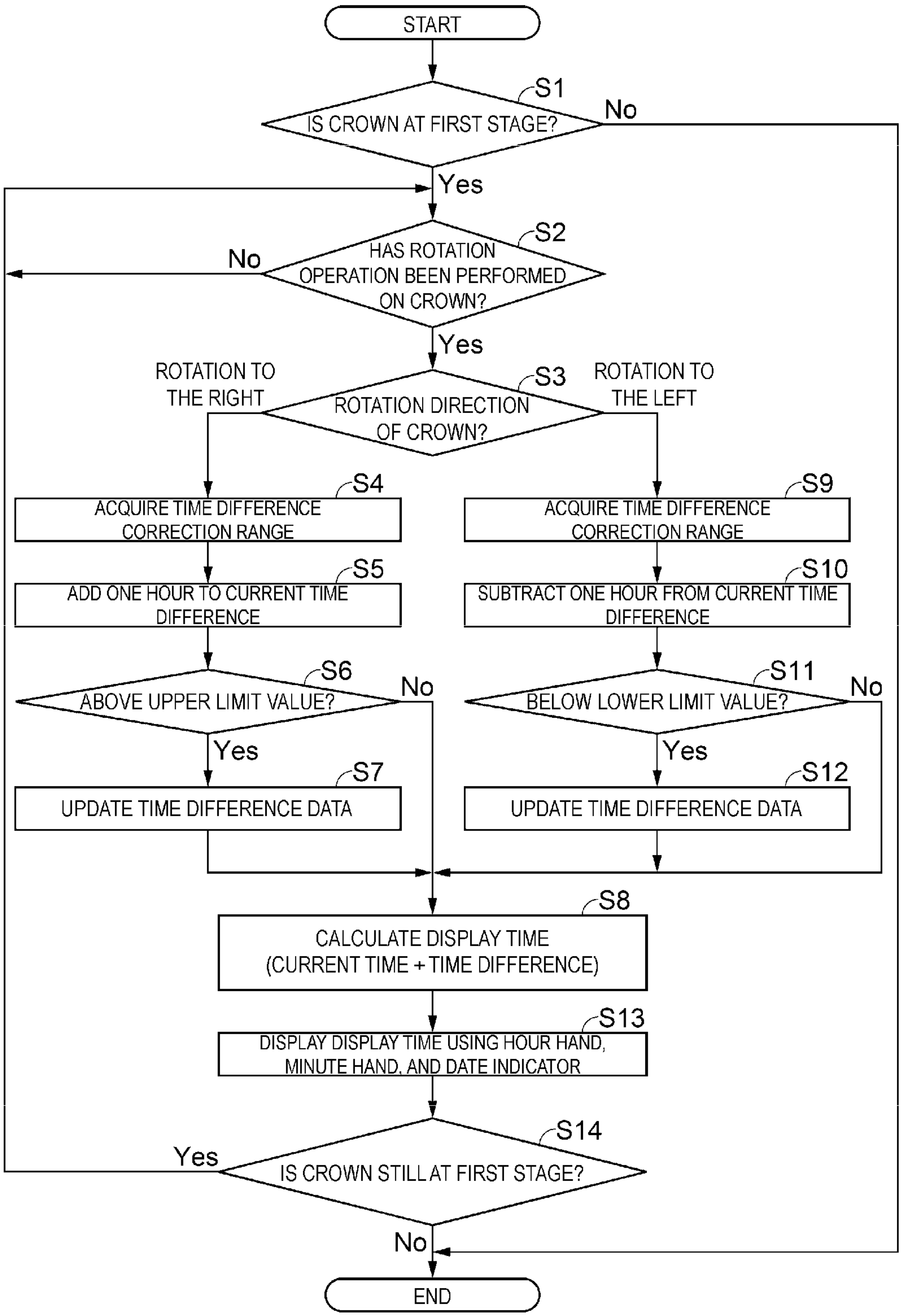
FIG. 6 is a flowchart illustrating time difference correction processing performed by the electronic watch.

FIG. 6 is a flowchart illustrating time difference correction processing performed by the electronic watch 1. A method for the time difference correction processing will be described below with reference to FIG. 6. Note that in the present embodiment, when the crown 6 is positioned at the first stage, the electronic watch 1 is set to transition to a time difference correction mode at a one hour correction interval.

As illustrated in FIG. 6, at step S1, the controller 70 causes the input determination controller 760 to determine whether or not the user has pulled out the crown 6 to the first stage. When the input determination controller 760 has made a NO determination, the controller 70 terminates the flow illustrated in FIG. 6. Note that in order to execute the flow illustrated in FIG. 6 at regular intervals, during a period in which the determination is NO at step S1, the controller 70 causes the input determination controller 760 to repeatedly perform the processing at step S1 at regular intervals.

Then, when a YES determination is made by the input determination controller 760 at step S1, the controller 70 causes the input determination controller 760 to perform processing at step S2. At step S2, the controller 70 causes the input determination controller 760 to determine whether or not there has been an input by the rotation operation of the crown 6. When a NO determination is made at step S2, the controller 70 causes the input determination controller 760 to repeatedly perform the determination processing.

When a YES determination is made at step S2, the controller 70 causes the input determination controller 760 to perform processing at step S3. At step S3, the controller 70 causes the input determination controller 760 to determine whether the rotation direction of the crown 6 is the rotation to the right or the rotation to the left. The rotation to the right is also referred to as a normal rotation or a clockwise rotation, and the rotation to the left is also referred to as a reverse rotation or a counter-clockwise rotation. Note that the rotation direction of the crown 6 is a rotation direction thereof when the crown 6 is viewed from the outside of the electronic watch 1.

When it is determined at step S3 that the rotation direction of the crown 6 is the rotation to the right, the controller 70 causes the time difference correction controller 730 to perform processing at step S4. At step S4, the controller 70 causes the time difference correction controller 730 to acquire the time difference correction range data 640 of the reference time data 610. Note that a method for acquiring the time difference correction range data 640 will be described in detail below.

Next, at step S5, the controller 70 causes the time difference correction controller 730 to add one hour to the time difference data 620.

Then, at step S6, the controller 70 causes the time difference correction controller 730 to determine whether or not the time difference data 620 obtained after the addition exceeds the time difference upper limit value 641 of the time difference correction range data 640.

When a YES determination is made at step S6, the controller 70 causes the time difference correction controller 730 to perform processing at step S7. At step S7, the controller 70 causes the time difference correction controller 730 to update the time difference data 620 to a value obtained by adding an amount of time by which the time difference data 620 obtained after the addition at step S5 has exceeded the time difference upper limit value 641, to the time difference lower limit 643 of the time difference correction range data 640. In this way, the value of the time difference data is looped within the time-difference setting range. When a NO determination is made at step S6 and the processing at step S7 is performed, the processing advances to step S8.

At step S8, the controller 70 causes the time difference correction controller 730 to correct the time-display time data 630 using the updated time difference data 620 and the reference time data 610.

At step S13, the controller 70 causes the display controller 750 to move the hour hand 3D in the clockwise direction and cause the hour hand 3D to indicate a time of the time-display time data 630 that has been updated at step S8. At this time, when the date of the time-display time data 630 changes from before to after the updating, the display controller 750 moves the date indicator 5 in the counter-clockwise direction, to cause the date indicator 5 to indicate the date of the time-display time data 630 after the updating.

When display of the time-display time data 630 is completed at step S13, the control device 70 causes the input determination controller 760 to perform processing at step S14.

At step S14, the controller 70 causes the input determination controller 760 to determine whether or not the position of the crown 6 is the first stage. When a YES determination is made at step S14, the controller 70 causes the input determination controller 760 to perform the determination processing at step S2 once again. When a NO determination is made at step S14, the controller 70 terminates the processing of FIG. 6. For example, when the currently set time difference information is +9 hours, the time difference correction controller 730 updates the time difference information to +10 hours when an input of the rotation to the right is made once, and updates the time difference information to +12 hours when the input of the rotation to the right is made three times.

On the other hand, when it is determined that the rotation direction of the crown 6 is the rotation to the left at step S3, the controller 70 causes the time difference correction controller 730 to perform processing at step S9.

At step S9, the controller 70 causes the time difference correction controller 730 to acquire the time difference correction range data 640 from the reference time data 610. Note that the method for acquiring the time difference correction range data 640 will be described in detail below.

Next, at step S10, the controller 70 causes the time difference correction controller 730 to subtract one hour from the time difference data 620.

Then, at step S11, the controller 70 causes the time difference correction controller 730 to determine whether or not the time difference data 620 obtained after the subtraction falls below the time difference lower limit value 643 of the time difference correction range data 640.

When a YES determination is made at step S11, the controller 70 causes the time difference correction controller 730 to perform processing at step S12. At step S12, the controller 70 causes the time difference correction controller 730 to update the time difference data 620 to a value obtained by subtracting an amount of time by which the time difference data 620 obtained after the subtraction at step 10 has fallen below the time difference lower limit value 643, from the time difference upper limit 641 of the time difference correction range data 640. In this way, the value of the time difference data is looped within the time-difference setting range. When a NO determination is made at step S11, the processing advances to step S8.

At step S8, the controller 70 causes the time difference correction controller 730 to correct the time-display time data 630 using the updated time difference data 620 and the reference time data 610.

At step S13, the controller 70 causes the display controller 750 to move the hour hand 3D in the counter-clockwise direction and causes the hour hand 3D to indicate the time of the time-display time data 630 that has been updated at step S8. At this time, when the date of the time-display time data 630 changes from before to after the updating, the display controller 750 moves the date indicator 5 in the clockwise direction, to cause the date indicator 5 to indicate the date of the time-display time data 630 after the updating.

When the display of the time-display time data 630 is completed at step S13, the controller 70 causes the input determination controller 760 to perform processing at step S14. At step S14, the controller 70 causes the input determination controller 760 to determine whether or not the position of the crown 6 is the first stage. When a YES determination is made at step S14, the controller 70 causes the input determination controller 760 to perform the determination processing at step S2 once again. When a NO determination is made at step S14, the controller 70 terminates the processing of FIG. 6. For example, when the currently set time difference information is +9 hours, the time difference correction controller 730 updates the time difference information to +8 hours when an input of the rotation to the left is made once, and updates the time difference information to +6 hours when the input of the rotation to the left is made three times.

Figure 7:
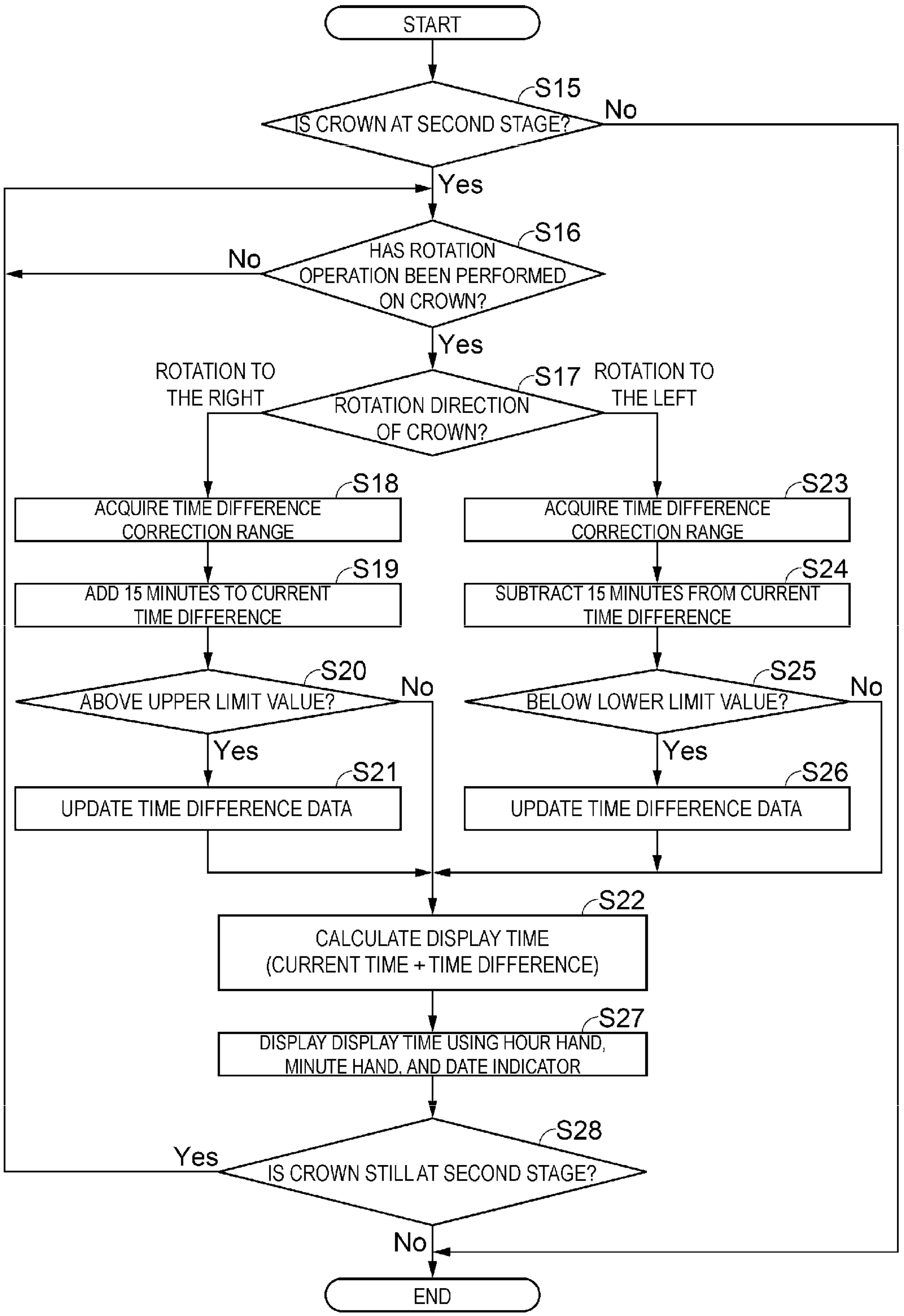
FIG. 7 is a flowchart illustrating a method for the time difference correction processing of the electronic watch.

FIG. 7 is a flowchart illustrating the method for the time difference correction processing of the electronic watch 1. The method for the time difference correction processing will be described below with reference to FIG. 7. In the present embodiment, when the crown 6 is positioned at the second stage, the electronic watch 1 is set to transition to the time difference correction mode that uses a 15-minute correction interval.

As illustrated in FIG. 7, at step S15, the controller 70 causes the input determination controller 760 to determine whether or not the user has pulled out the crown 6 to the second stage. When the input determination controller 760 has made a NO determination, the controller 70 terminates the processing illustrated in FIG. 7. Note that in order to perform the processing illustrated in FIG. 7 at regular intervals, during a period in which the determination is NO at step S15, the controller 70 causes the input determination controller 760 to repeatedly perform the processing at step S15 at regular intervals.

Then, when a YES determination is made by the input determination controller 760 at step S15, the controller 70 causes the input determination controller 760 to perform processing at step S16. At step S16, the controller 70 causes the input determination controller 760 to determine whether or not there has been an input by the rotation operation of the crown 6. When a NO determination is made at step S16, the controller 70 causes the input determination controller 760 to repeatedly perform the determination processing at step S16.

When a YES determination is made at step S16, the controller 70 causes the input determination controller 760 to perform processing at step S17. At step S17, the controller 70 causes the input determination controller 760 to determine whether the rotation direction of the crown 6 is the rotation to the right or the rotation to the left.

When it is determined at step S17 that the rotation direction of the crown 6 is the rotation to the right, the controller 70 causes the time difference correction controller 730 to perform processing at step S18. At step S18, the controller 70 causes the time difference correction controller 730 to acquire the time difference correction range data 640 from the reference time data 610. Note that the method for acquiring the time difference correction range data 640 will be described in detail below.

Next, at step S19, the controller 70 causes the time difference correction controller 730 to add 15 minutes to the time difference data 620.

Then, at step S20, the controller 70 causes the time difference correction controller 730 to determine whether or not the time difference data 620 obtained after the addition exceeds the time difference upper limit value 641 of the time difference correction range data 640.

When a YES determination is made at step S20, the controller 70 causes the time difference correction controller 730 to perform processing at step S21. At step S21, the controller 70 causes the time difference correction controller 730 to update the time difference data 620 to a value obtained by adding an amount of time by which the time difference data 620 obtained after the addition at step S19 has exceeded the time difference upper limit value 641, to the time difference lower limit 643 of the time difference correction range data 640.

At step S22, the controller 70 causes the time difference correction controller 730 to correct the time-display time data 630 using the updated time difference data 620 and the reference time data 610.

At step S27, the controller 70 causes the display controller 750 to simultaneously move the hour hand 3D and the minute hand 3C in the clockwise direction and causes the hour hand 3D and the minute hand 3C to indicate the time of the time-display time data 630 that has been updated at step S22. At this time, when the date of the time-display time data 630 changes from before to after the updating, the display controller 750 moves the date indicator 5 in the counter-clockwise direction, to indicate the date of the time-display time data 630 after the updating.

When the display of the time-display time data 630 is completed at step S27, the controller 70 causes the input determination controller 760 to perform processing at step S28. At step S28, the controller 70 causes the input determination controller 760 to determine whether or not the position of the crown 6 is the second stage. When a YES determination is made at step S28, the controller 70 causes the input determination controller 760 to perform the determination processing once again. When a NO determination is made at step S28, the controller 70 terminates the processing of FIG. 7.

For example, when the currently set time difference information is −9 hours and 30 minutes, the time difference correction controller 730 updates the time difference information to −9 hours and 15 minutes when the input of the rotation to the right is made once, and updates the time difference information to −8 hours and 45 minutes when the input of the rotation to the right is made three times.

When it is determined at step S17 that the rotation direction of the crown 6 is the rotation to the left, the controller 70 causes the time difference correction controller 730 to perform processing at step S23. At step S23, the controller 70 causes the time difference correction controller 730 to acquire the time difference correction range data 640 from the reference time data 610. Note that the method for acquiring the time difference correction range data 640 will be described in detail below.

Next, at step S24, the controller 70 causes the time difference correction controller 730 to subtract 15 minutes from the time difference data 620. Then, at step S25, the controller 70 causes the time difference correction controller 730 to determine whether or not the time difference data 620 obtained after the subtraction falls below the time difference lower limit value 643 of the time difference correction range data 640.

When a YES determination is made at step S25, the controller 70 causes the time difference correction controller 730 to perform processing at step S26. At step S26, the controller 70 causes the time difference correction controller 730 to update the time difference data 620 to a value obtained by subtracting an amount of time by which the time difference data 620 obtained after the subtraction at step S24 has fallen below the time difference lower limit value 643, from the time difference upper limit 641 of the time difference correction range data 640. When a NO determination is made at step S25, the processing advances to step S22.

Next, at step S22, the controller 70 causes the time difference correction controller 730 to correct the time-display time data 630 using the updated time difference data 620 and the reference time data 610.

At step S27, the controller 70 causes the display controller 750 to simultaneously move the hour hand 3D and the minute hand 3C in the counter-clockwise direction and cause the hour hand 3D and the minute hand 3C to indicate the time of the time-display time data 630 that has been updated at step S22. At this time, when the date of the time-display time data 630 changes from before to after the updating, the display controller 750 moves the date indicator 5 in the clockwise direction, to cause the date indicator 5 to indicate the date of the time-display time data 630 after the updating.

When the display of the time-display time data 630 is completed at step S27, the controller 70 causes the input determination controller 760 to perform processing at step S28. At step S28, the controller 70 causes the input determination controller 760 to determine whether or not the position of the crown 6 is the second stage. When a YES determination is made at step S28, the controller 70 causes the input determination controller 760 to perform the determination processing at step S16 again. When a NO determination is made at step S28, the controller 70 terminates the processing of FIG. 7.

For example, when the currently set time difference information is −10 hours and 30 minutes, the time difference correction controller 730 updates the time difference information to −10 hours and 45 minutes when the input of the rotation to the left is made once, and updates the time difference information to −11 hours and 15 minutes when the input of the rotation to the left is made three times.

Figure 8:
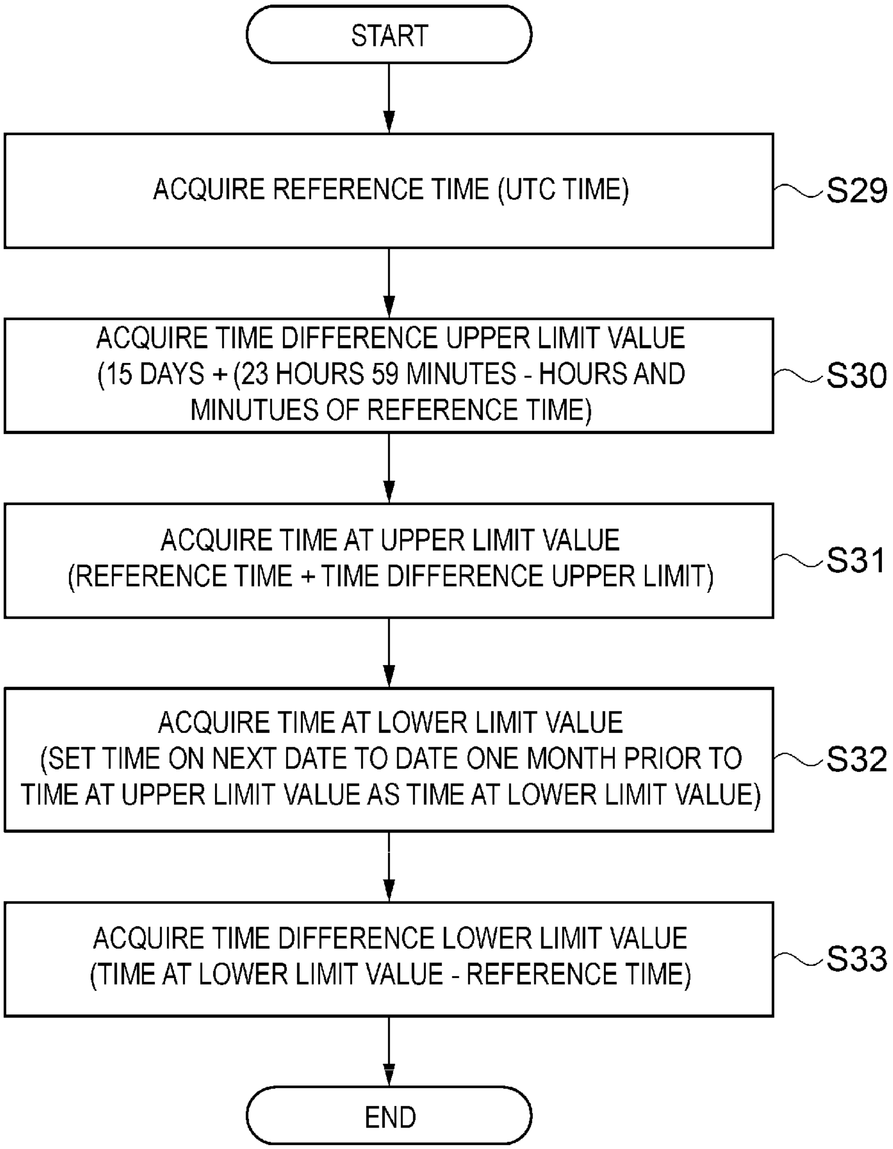
FIG. 8 is a flowchart illustrating time difference correction range acquisition processing performed by the electronic watch.

FIG. 8 is a flowchart illustrating time difference correction range acquisition processing performed by the electronic watch 1. A method for the time difference correction range acquisition processing will be described below with reference to FIG. 8. Note that in the present embodiment, the time difference correction range acquisition processing is performed every time the input determination controller 760 makes a determination on the rotation direction of the crown 6 at step S3 or step S16, during the time difference correction mode using the one hour interval or during the time difference correction mode using the 15-minute interval.

At step S29, the controller 70 causes the time difference correction controller 730 to acquire the current reference time data 610.

Next, at step S30, the controller 70 causes the time difference correction controller 730 to set the time difference upper limit value 641 to a time obtained by subtracting the reference time data 610 acquired at step 29 from 23:59 and adding 360 hours, which is equivalent to 15 days, to the time obtained after the subtraction.

At step S31, the controller 70 causes the time difference correction controller 730 to set the time at the upper limit value 642 of the time difference correction range data 640 to a time obtained by adding the time difference upper limit value 641 set at step S30 to the reference time data 610 acquired at step S29.

Note that the order of step S30 and step S31 may be reversed. In that case, first at step S31, the controller 70 causes the time difference correction controller 730 to set the time at the upper limit value 642 of the time difference correction range data 640 to 23:59 on a date that is 15 days ahead of the date of the reference time data 610 acquired at step S29.

Next, at step S30, the controller 70 causes the time difference correction controller 730 to set a difference in time, that is, a time period obtained by subtracting the reference time data 610 acquired at step S29 from the time at the upper limit value 642 that has been set as the time difference upper limit value 641 of the time difference correction range data 640. For example, when the reference time is 10:10:30 (10 hours 10 minutes and 30 seconds) on Jan. 1, 2019, the time difference upper limit value 641 is 15 days plus 13 hours and 49 minutes, and the time at the upper limit value 642 is 23:59 on Jan. 16, 2019.

At step S32, the controller 70 causes the time difference correction controller 730 to set the time at the lower limit value 644 of the time difference correction range data 640 on the basis of the time at the upper limit value 642. The time at the lower limit value 644 is set to be 00:00 of the next day following the date one month before the date of the time at the upper limit value 642.

At this time, a date that does not exist, such as February 30, cannot be set, and the date is set to March 1 of the next month. For example, when the date of the time at the upper limit value 642 is Apr. 1, 2010, the date of the time at the lower limit value 644 is Mar. 2, 2010, and when the date of the time at the upper limit value is Mar. 29, 2010, the date of the time at the lower limit value 644 is Mar. 1, 2010.

As a result, the time difference correction range becomes from Mar. 2, 2010 to Apr. 1, 2010, or from Mar. 1, 2010 to Mar. 29, 2010, and in each case, the time difference correction range is set so as not to include a plurality of the same dates such as March 1 and April 1.

At step S33, the controller 70 causes the time difference correction controller 730 to set the time difference lower limit value 643 of the time difference correction range data 640. The time difference lower limit value 643 is set to a time, that is, a time period obtained by subtracting the time at the lower limit value 644 set at step S31 from the reference time data 610 acquired at step S29.

As described above, according to the electronic watch 1 of the present embodiment, the following effects can be obtained.

(1) According to the present embodiment, even without the display of the time zone, the time difference can be appropriately corrected by performing the correction at the one hour or the 15-minute interval.

(2) According to the present embodiment, by limiting the correction range to one month so as not to include the same date in the set range, it is possible to prevent a case in which the month and year information is set wrongly in an inconsistent manner, even when the date is set correctly. In addition, when the correction range is limited to one month, it is possible to maintain continuity of the date between the upper limit value and the lower limit value. In other words, when updating from the upper limit value to the lower limit value, or when updating from the lower limit value to the upper limit value, the movement of the date indicator 5 can be reduced. As a result, a time period in which the user cannot perform any operation due to the movement of the date indicator 5 during the correction can be shortened.

(3) According to the present embodiment, at the time of the time difference correction, when the correction is performed up to a boundary of the correction range, the correction operation is set not to stop at the boundary, but to be looped to the opposite boundary. As a result, as in a time adjustment in a general watch, such as a mechanical watch, it is possible to continuously rotate the hands 3 and the date indicator 5 without stopping them, and intuitive operability can thus be realized.

(4) According to the present embodiment, by setting the lower limit value of the correction range to 00:00 and the upper limit value to 23:59, which is immediately before the date changes, the timing of switchover of the range can be matched up with the date change, thereby preventing the date indicator 5 from moving at an unnatural timing. As a result, recognition by the user can be improved.

Modified Example

Further, the above-described embodiment may be modified as follows.

Figure 9:
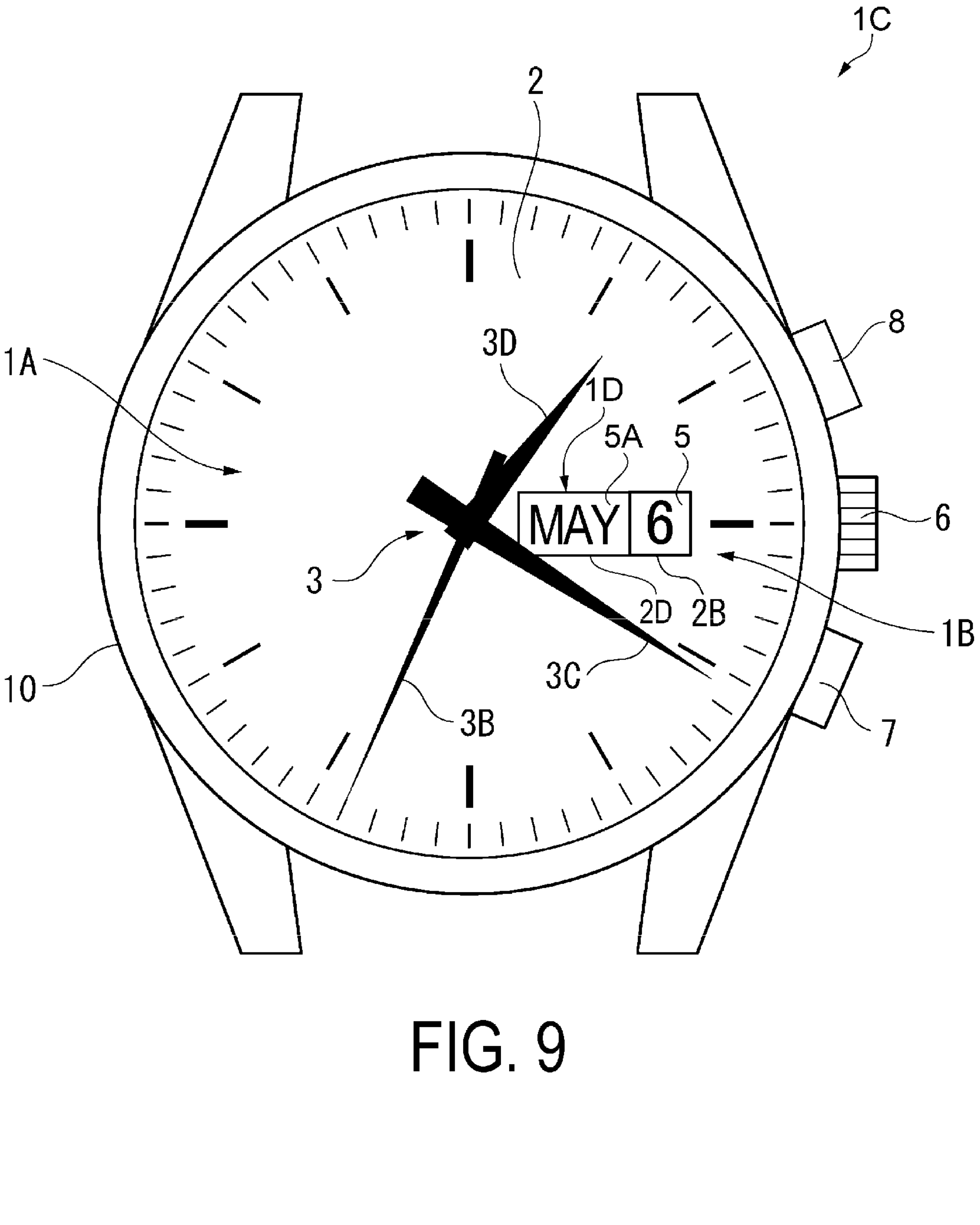
FIG. 9 is a front view illustrating an external appearance of an electronic watch of a modified example.
Figure 10:
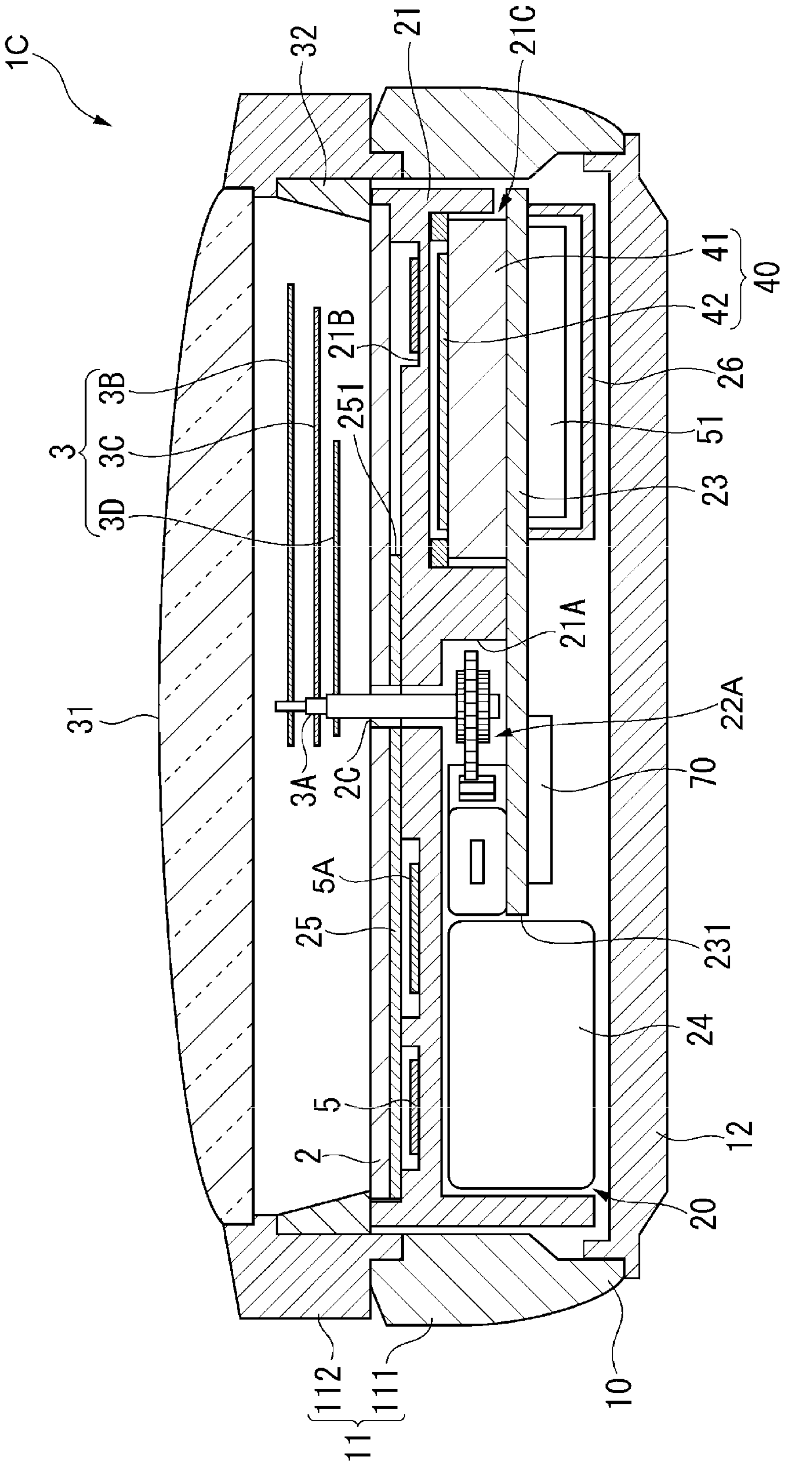
FIG. 10 is a cross-sectional view illustrating a structure of the electronic watch illustrated in FIG. 9.

In the embodiment described above, the electronic watch 1 provided with the calendar display function is described, but, as illustrated in FIG. 9, an electronic watch 1C further provided with a month display function may also be implemented. FIG. 9 is a front view illustrating the electronic watch 1C provided with the month display function, in addition to the same configuration as that of the above-described embodiment. FIG. 10 is a cross-sectional view illustrating a structure of the electronic watch 1C illustrated in FIG. 9.

Specifically, as illustrated in FIG. 9 and FIG. 10, the electronic watch 1C is the electronic watch 1C provided with a month window 2D of the dial 2 and a month display unit 1D including a month indicator 5A, in addition to the same configuration as that of the above-described embodiment.

The hands 3, the date indicator 5 and the month indicator 5A are driven via a drive mechanism 22A that includes a step motor, a train wheel, and the like. In addition to the drive mechanism 22 of the above-described embodiment, the drive mechanism 22A includes a fifth step motor (not illustrated) and a fifth train wheel (not illustrated) that drive the month indicator 5A. In other words, the fifth step motor configures a month indicator motor.

Figure 11:
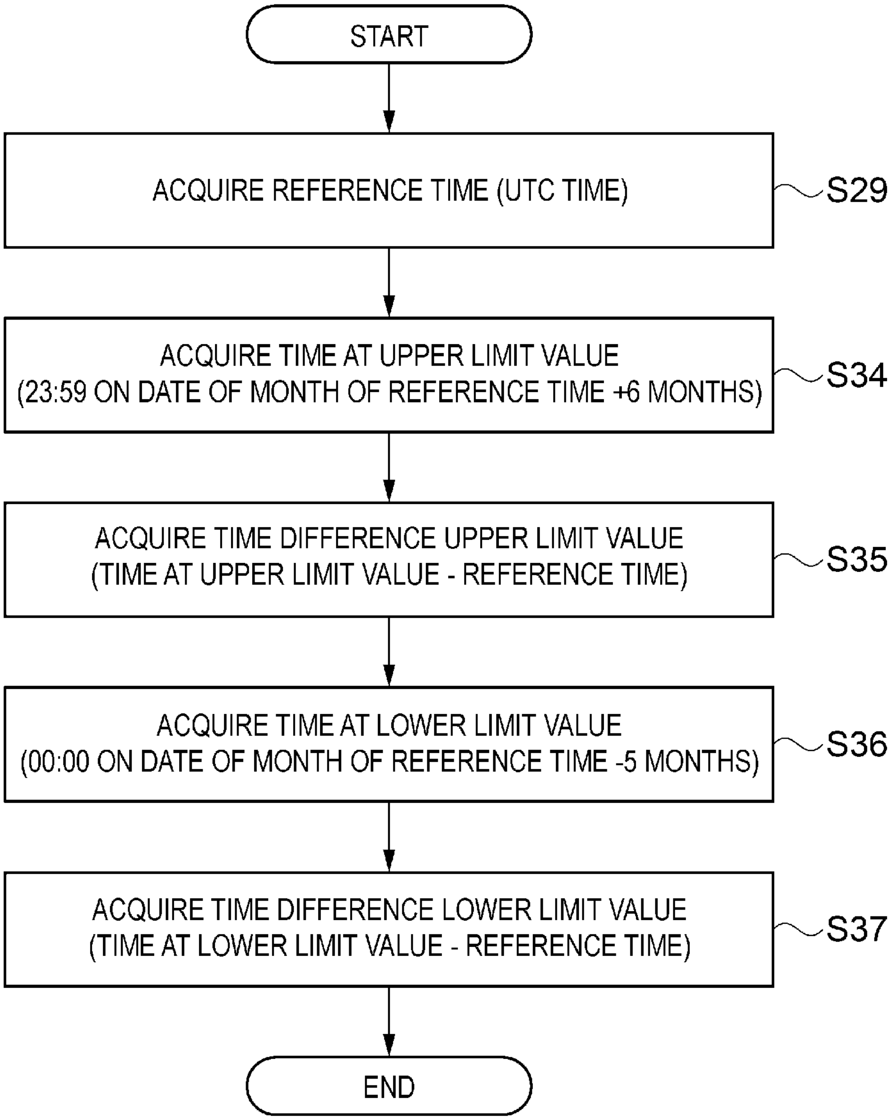
FIG. 11 is a flowchart illustrating time difference correction range acquisition processing performed by the electronic watch of the modified example.

FIG. 11 is a flowchart illustrating time difference correction range acquisition processing performed by the electronic watch 1C of the modified example. A method for the time difference correction range acquisition processing will be described below with reference to FIG. 11. Note that in the present embodiment, the time difference correction range acquisition processing is performed every time the input determination controller 760 makes a determination on the rotation direction of the crown 6, during the time difference correction mode using the one hour interval or during the time difference correction mode using the 15-minute interval.

At step S29, the controller 70 causes the time difference correction controller 730 to acquire the current reference time data 610.

Next, at step S34, the controller 70 causes the time difference correction controller 730 to set the time at the upper limit value 642 of the time difference correction range data 640. The time at the upper limit value 642 is set to 23:59 on the last date of the month that is six months ahead of the reference time data 610 acquired at step S29.

Next, at step S35, the controller 70 causes the time difference correction controller 730 to set the time difference upper limit value 641 of the time difference correction range data 640. The time difference upper limit value 641 is set to a difference in time, that is, a time period obtained by subtracting the reference time data 610 acquired at step S29 from the time at the upper limit value 642 set at step S34. For example, when the reference time is 15:15:30 (15 hours 15 minutes and 30 seconds) on Sep. 10, 2018, the time at the upper limit value 642 is 23:59 on Mar. 31, 2019, and the time difference upper limit value is 6 months, 21 days, 8 hours, and 44 minutes.

Next, at step S36, the controller 70 causes the time difference correction controller 730 to set the time at the lower limit value 644 of the time difference correction range data 640. The time at the lower limit value 644 is set to 00:00 on the first date of the month that is 5 months prior to the reference time data 610 acquired at step S29.

Next, at step S37, the controller 70 causes the time difference correction controller 730 to set the time difference lower limit value 643 of the time difference correction range data 640. The time difference lower limit value 643 is set to a difference in time, that is, a time period obtained by subtracting the time at the lower limit value 644 set at step S36 from the reference time data 610 acquired at step S29. For example, when the reference time is 15:15:30 (15 hours 15 minutes and 30 seconds) on Sep. 10, 2018, the time at the lower limit value 644 is 00:00 on Apr. 1, 2018, and the time difference lower limit value is −5 months, 9 days, 15 hours, and 15 minutes.

As described above, according to the electronic watch 1C of the present modified example, even when display information is increased and management of the time difference information becomes more complex compared with the electronic watch 1 of the above-described embodiment, the same effects as those of the above-described embodiment can be achieved.

In the embodiment described above, the time difference correction range is variable within one month, but no such limitation is intended, and the number of days of the time difference correction range may be set in a fixed manner. At this time, the upper limit can be changed within a range from +1 day to +15 days, and the lower limit can be changed within a range from −1 day to −12 days, in one-day units. A specific example will be described below.

Figure 12:
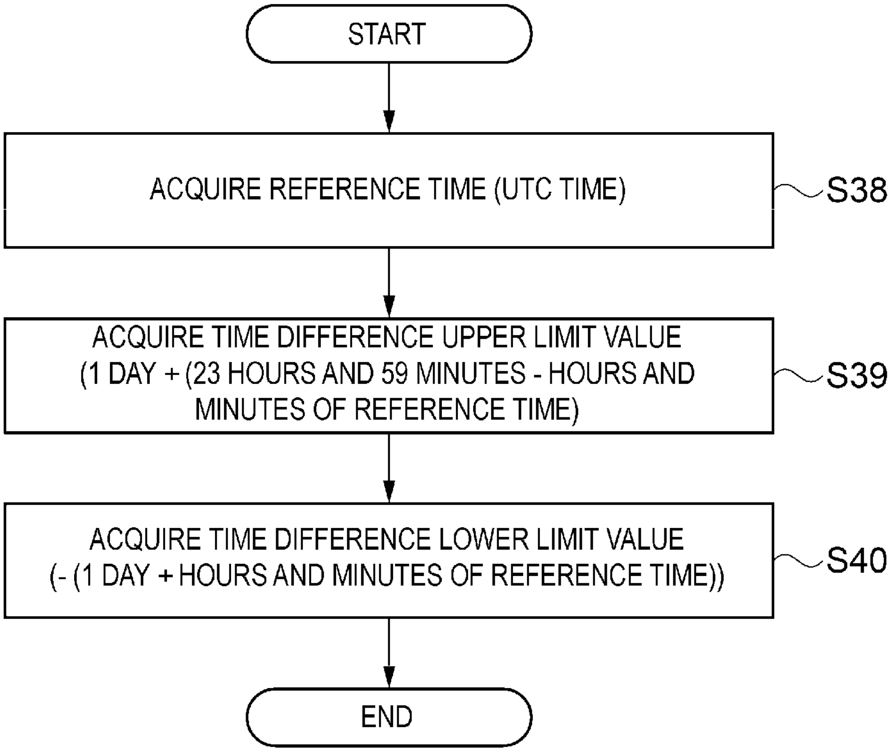
FIG. 12 is a flowchart illustrating the time difference correction range acquisition processing performed by the electronic watch of the modified example.

FIG. 12 is a flowchart illustrating the time difference correction range acquisition processing performed by the electronic watch 1E. Note that a case in which the time difference correction range is set using ± one day will be described as an example.

At step S38, the controller 70 causes the time difference correction controller 730 to obtain the reference time data 610. Next, at step S39, the controller 70 causes the time difference correction controller 730 to set the time difference upper limit value 641 of the time difference correction range data 640. The time difference upper limit value 644 is set to a difference in time, that is, a time period obtained by subtracting the time (hours and minutes) of the reference time data 610 acquired at step S38 from 23 hours and 59 minutes and adding one day after the subtraction.

Next, at step S40, the controller 70 causes the time difference correction controller 730 to set the time difference lower limit value 643 of the time difference correction range data 640. The time difference lower limit value 643 is set to a time obtained by adding one day to the time of the reference time data 610 acquired at step S38. At this time, since it is the lower limit value, the minus sign is attached to the time to be set.

As described above, according to the electronic watch 1E according to the present modified example, when attempting to correctly set the time difference from a state in which the time difference is significantly off the mark, it is possible to shorten a time required to correct the time difference compared with the electronic watch 1 of the above-described embodiment.

In the above-described modified example, the time difference correction range is set to one year, but no such limitation is intended, and the number of months of the upper limit and the lower limit of the time difference correction range may be changed within a range from +1 month to +6 months with respect to the upper limit, and within a range from −1 month to −5 months with respect to the lower limit, in one-month units.

According to this electronic watch 1F, in a case in which the display information is expanded and the management of the time information and the time difference information becomes more complex compared with the electronic watch 1 of the above-described embodiment, when attempting to correctly set the time difference from a state in which the time difference is significantly off the mark, the time required to correct the time difference can be shortened.

Contents derived from the above-described embodiment will be described below.

An electronic watch includes memory configured to store a reference time and a time difference relative to the reference time, a timekeeper configured to clock the reference time, a time display unit including an hour hand and configured to display a display time based on the reference time and the time difference, a calendar display unit configured to display a date based on the reference time and the time difference, an operation device including a crown or a button, and a control unit configured to correct, within a set time-difference setting range, the time difference at a regular interval for each of operations of the operation device, and to update the hour hand and the date in accordance with the time difference corrected for each of the operations of the operation device.

According to this configuration, since the time difference is corrected within the time-difference setting range, it is possible to prevent the time difference from being corrected to a wrong date and thus possible to prevent the time difference from being set to a wrong time difference. Further, by performing the correction at the regular interval, the time difference correction similar to a time adjustment in a general watch that does not have a reception function becomes possible, and intuitive operability can thus be realized.

In the above-described electronic watch, the time-difference setting range is preferably one month relative to the reference time clocked by the timekeeper.

According to this configuration, by setting the time-difference setting range to one month, the same date does not exist in the time-difference setting range, and it is thus possible to prevent the time difference from being set to a wrong date.

In the above-described electronic watch, it is preferable that the time-difference setting range have a forward setting range of up to 15 days and a backward setting range of from 12 days to 15 days relative to the reference time timed by the timekeeper.

According to this configuration, although numbers 1 to 31 are marked on the date indicator that is used for displaying the date, by limiting the number of days of the backward setting range to a certain range, the date indicator can be continuously operated, and it is thus possible to cause the movement of the date indicator to appear natural when correcting the time difference. In this way, the date does not significantly change from before to after updating the time difference data, so a time period during which the date indicator is being operated and in which the user cannot perform any operation can be shortened.

In the above-described electronic watch, the time-difference setting range preferably has 23:59 as an upper limit time for the forward setting range, and has 00:00 as the lower limit time for a backward setting range.

According to this configuration, since a time of the time-difference setting range is set to the time immediately before the date changes by a minute, the same date does not exist within the correction range, and it is thus possible to maintain continuity of the time.

In the above-described electronic watch, an interval of correction of the time difference is preferably one hour or 15 minutes, and the interval of correction is preferably switched over based on the operation of the operating device.

According to this configuration, since the correction interval of the time difference is 15 minutes, it is possible to deal with time differences and summer times that actually exist. Further, since the correction interval of the time difference is one hour, when significantly changing the time difference, a time required for the correction can be shortened.

In the above-described electronic watch, correction of the time difference is preferably performed, with a value of the time difference being looped within the time-difference setting range.

According to this configuration, by looping the correction of the time difference and not stopping the operation at boundary values, it is possible to make the time appear to be continuously put forward with respect to the time and date displayed. Thus, it is possible to correct the time difference without stopping the time, in a similar manner to the time adjustment in a mechanical watch or the like that does not have the reception function, and the intuitive operability can thus be realized.

What is claimed is:

1. An electronic watch comprising:

a receiver configured to receive a satellite signal from a GPS satellite;

a memory configured to store a reference time, a time difference, and a time difference correction range, the time difference corresponding to a difference between a local time in a current position and the reference time, the reference time corresponding to universal time coordinated (UTC), the reference time having year, month, and day information, the time difference correction range including an upper limit value and a lower limit value, the upper limit value corresponding to a forwarded time from the reference time and having the year, month, and day information, the lower limit value corresponding to a backwarded time from the reference time and having the year, month, and day information;

a timekeeper configured to clock the reference time;

a time display unit including an hour hand and configured to display a display time based on the reference time and the time difference via the timekeeper;

a calendar display unit configured to display only a date based on the reference time and the time difference via the timekeeper, the calendar display unit having a ring-shaped date indicator at which numbers 1 to 31 are marked;

an operation device including a crown or a button; and a controller configured to:

cause the memory to store the reference time and the time difference in response to the received satellite signal;

set the time difference correction range between the upper limit value and the lower limit value to a constant period of one month relative to the clocked reference time by the timekeeper, wherein a specific day of the upper limit value and a specific day of the lower limit value are respectively set according to the reference time, which has the year, month, and day information, at a time when a mode of the electronic watch is changed to a time difference correction mode by operating the operation device; and days as the day information of the time difference correction range are set under the following conditions:

same days as the day information do not exist in the time difference correction range regardless of a corrected amount; and a position of the day in the ring-shaped date indicator when the corrected amount corresponds to the upper limit value and a position of the day in the ring-shaped date indicator when the corrected amount corresponds to the lower limit value are adjacent to each other;

correct the time difference with the corrected amount created by operating the operation device at a regular interval for each of the operations of the operation device to obtain the corrected time difference, wherein when the corrected amount is within the time difference correction range, the controller is configured to generate a regular corrected time difference;

when the corrected amount forwardly exceeds the upper limit value by a first exceeded value, the controller is configured to generate a first update corrected time difference, and the first update corrected time difference corresponds to a first value obtained by adding the lower limit value and the first exceeded value; and when the corrected amount backwardly exceeds the lower limit value by a second exceeded value, the controller is configured to generate a second update corrected time difference, and the second update corrected time difference corresponds to a second value obtained by subtracting the second exceeded value from the upper limit value; and cause the timekeeper to update the hour hand and the date in accordance with the regular corrected time difference and either the first update corrected time difference or the second update corrected time difference.

2. The electronic watch according to claim 1, wherein the regular interval of the correction of the time difference is one hour or 15 minutes, and the regular interval of the correction is switched over based on the operation of the operating device.

3. The electronic watch according to claim 1, wherein the correction of the time difference is performed, with a value of the time difference being looped within the time difference correction range within which the time difference is corrected.

4. The electronic watch according to claim 1, comprising a month display unit configured to display a month based on the reference time and the time difference.

* * * * *